(12) United States Patent
Whang et al.

(10) Patent No.: US 8,108,356 B2
(45) Date of Patent: Jan. 31, 2012

(54) METHOD FOR RECOVERING DATA IN A STORAGE SYSTEM

(75) Inventors: Kyu Young Whang, Daejon (KR); Young Koo Lee, Daejon (KR); Yi Reun Kim, Gwangju (KR); Hyo Sang Lim, Gyeonggi-do (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 561 days.

(21) Appl. No.: 12/208,014

(22) Filed: Sep. 10, 2008

(65) Prior Publication Data

US 2009/0164524 A1 Jun. 25, 2009

(30) Foreign Application Priority Data

Dec. 24, 2007 (KR) .................. 10-2007-0135981

(51) Int. Cl.
*G06F 7/00* (2006.01)
*G06F 17/00* (2006.01)
(52) U.S. Cl. ........................ 707/674; 707/661
(58) Field of Classification Search .................. None
See application file for complete search history.

(56) References Cited

U.S. PATENT DOCUMENTS

| | | | | |
|---|---|---|---|---|
| 4,945,474 A * | 7/1990 | Elliott et al. | ..................... | 714/16 |
| 5,280,611 A * | 1/1994 | Mohan et al. | ......................... | 1/1 |
| 5,455,946 A * | 10/1995 | Mohan et al. | ......................... | 1/1 |
| 5,724,581 A * | 3/1998 | Kozakura | ..................... | 707/674 |
| 5,870,758 A * | 2/1999 | Bamford et al. | ..................... | 1/1 |
| 6,535,997 B1 * | 3/2003 | Janson et al. | ..................... | 714/15 |
| 6,820,099 B1 * | 11/2004 | Huber et al. | .................. | 707/649 |
| 6,839,819 B2 * | 1/2005 | Martin | .......................... | 711/162 |
| 7,321,907 B2 * | 1/2008 | Tsuchida et al. | .............. | 707/607 |
| 7,440,979 B2 * | 10/2008 | Strahl et al. | .......................... | 1/1 |
| 7,555,504 B2 * | 6/2009 | Bixby et al. | ......................... | 1/1 |
| 7,613,698 B2 * | 11/2009 | Verma et al. | ......................... | 1/1 |
| 7,661,028 B2 * | 2/2010 | Erofeev | .......................... | 714/15 |
| 7,698,319 B2 * | 4/2010 | Taniguchi et al. | ............ | 707/674 |
| 7,716,171 B2 * | 5/2010 | Kryger | .......................... | 707/649 |
| 7,962,709 B2 * | 6/2011 | Agrawal | ....................... | 711/162 |
| 2003/0208464 A1 * | 11/2003 | Lee et al. | ........................... | 707/1 |
| 2005/0223267 A1 * | 10/2005 | Fujibayashi | ..................... | 714/6 |
| 2006/0074977 A1 * | 4/2006 | Kothuri et al. | ............. | 707/104.1 |
| 2007/0073764 A1 * | 3/2007 | Oks et al. | ...................... | 707/102 |
| 2007/0174355 A1 * | 7/2007 | Woo et al. | ..................... | 707/202 |
| 2008/0120349 A1 * | 5/2008 | Kim et al. | ..................... | 707/202 |

* cited by examiner

*Primary Examiner* — Wilson Lee
*Assistant Examiner* — Jessica N Le
(74) *Attorney, Agent, or Firm* — Adam K. Sacharoff; Much Shelist

(57) ABSTRACT

In one aspect of the invention, there is disclosed a recovery method in a storage system that integrates shadow page and deferred update techniques. Updates of a page in the buffer are not immediately reflected to the database, but are deferred until the transaction is committed. Instead, the updated buffer page is stored in the log volume in the unit of a page. When reading a page that does not exist in the buffer from the disk, the up-to-date page from the database or from the log volume is read. Then the log table index is used to determine whether the up-to-date page exists in the database or in the log volume and to identify the position of the page stored in the log volume if the up-to-date page exists in the log volume.

4 Claims, 6 Drawing Sheets

METHOD FOR RECOVERING DATA IN A STORAGE SYSTEM

BACKGROUND OF THE INVENTION

1. Field of the Invention

The present invention relates to a recovery method using the combination of deferred-update and shadow page schemes and a storage system including the method.

2. Description of the Related Art

Recently, as the computer technology advances, the amount of data that are being stored and managed in the digital form is increasing rapidly. Accordingly, database management systems that are capable of storing and managing data efficiently are employed in various fields.

A 'storage system' is a core software corresponding to a low-level component of a database management system. It has a direct and important influence on the performance of database application programs. Such a storage system is responsible for the functions of storing and managing data in a disk, the transaction function, the concurrency control function, and the crash recovery function. Among these functions, the crash recovery function is used to prevent loss of data consistency that may occur due to various errors in the computer system.

There are two frequently used techniques for crash recovery in a storage system: 1) a deferred update technique and 2) a shadow page technique.

In the deferred update technique, storing a page in the buffer (a buffer page) that has been updated into the database on the disk is deferred until a transaction is committed. Here, when an updated buffer page needs to be stored in the disk, the updated buffer page is first stored in a deferred update file on the disk until a transaction is committed. Thus, the process of aborting a transaction is performed in such a way as to delete the deferred update file without an additional undo process because updated buffer pages have not been reflected in the database.

The process of committing a transaction is as follows. The updated buffer pages on a memory are first written (swapped out) to the deferred update file, and then, the updated pages stored in the deferred update file are reflected into the database. This two-step process is for being able to redo a transaction when a system failure occurs after storing the updated buffer pages into the deferred update file.

The deferred update technique has an advantage that disk access performance is not aggravated since the original location of the updated page in the database is not changed, and thus, logically related data remain clustered. However, it has a disadvantage that, since the updated data are not immediately reflected in the database; queries are executed on the database in which the updated data have not been reflected, and thus, the query results could be incorrect. This problem can be solved by designing a system to process a query in such a way as to access not only the database but also the deferred update file when the query is executed. However, this solution increases the complexity of the system because it must additionally access the deferred update file, as described above.

On the other hand, in the shadow page technique, an updated buffer page is directly stored into the database on the disk. Here, the original page (the page before being updated) in the database is left as a shadow page, and the updated buffer page is instead stored in the page that is newly allocated in the database. This technique uses two page tables—the shadow page table and the current page table—in order to manage pages in the database. Here, the page table is an index that returns the position of the page to be read in the disk. The process of starting a transaction (BEGIN) is performed by duplicating the page table (the original page table is called 'the shadow page table' and the duplicated page table 'the current page table'). When an updated buffer page needs to be stored in the disk during a transaction, the updated buffer page is stored in the page that is newly allocated in the database, and the current page table points to the newly allocated page. Thereafter, when reading a page that does not exist in the buffer from the database, a page that has been updated recently is accessed by using the current page table. The process of aborting a transaction (ABORT) is performed by deleting the updated pages and the current page table, and then restoring to the shadow page table. The process of committing a transaction (COMMIT) is performed by swapping out the updated buffer pages to the database and then making the current page table to be the shadow page table.

As described above, in the shadow page technique, the updated buffer page is stored in the database. Accordingly, the shadow page technique has less system complexity compared with the deferred update technique because it processes a query considering only the database (i.e., without considering the deferred update file as well) when the query is executed. However, when a page in the database is updated, the page is stored at a new position, rather than at the position of the original page. Thus, disk access performance is degraded because the clustering of logically related data is compromised.

SUMMARY OF THE INVENTION

The present invention has been made keeping in mind the above problems occurring in the prior art. The objectives of the present invention is to provide a crash recovery method in a storage system that minimizes the disadvantages of the prior arts—deferred update and shadow page techniques—and adopts only the advantages of these techniques and to provide storage system using the recovery method.

In order to accomplish the above objectives, the present invention provides the recovery method in a storage system, which includes the transaction management unit for managing transactions; the buffer management unit for storing an updated page in the buffer into the log volume and reading a page, which has been updated during the transaction, from the log volume and reading a page, which has not been updated during the transaction, from the database; and the recovery management unit for performing the process of committing a transaction, the process of aborting a transaction, and the process of restarting the system in compliance with a command from the transaction management unit. Here, the buffer management unit manages a log table index to identify the locations of the pages stored in the log volume.

Preferably, the process of reading a page from the disk during a transaction according to the present invention is performed in such a way that the buffer management unit reads the page from the log volume into the buffer if the page exists in the log volume, and reads the page from the database into the buffer if the page does not exist in the log volume.

The process of storing an updated buffer page into the disk during a transaction according to the present invention is performed in such a way that the buffer management unit stores an updated buffer page in the corresponding page in the log volume if the page exists in the log volume, and stores the updated buffer page in the page that is newly allocated in the log volume if the page does not exist in the log volume.

The process of committing a transaction according to the present invention is performed in such a way that the recovery management unit writes (swaps out) the updated buffer pages to the log volume, sets a flag in the log volume to committed, and then, writes each page stored in the log volume into the corresponding page in the database, sets the flag in the log volume to completed, and deletes the pages stored in the log volume and the log table index.

The process of aborting a transaction according to the present invention is performed in such a way that the recovery management unit deletes the updated pages in the buffer, the pages stored in the log volume, and the log table index.

The process of restarting a transaction according to the present invention is performed in such a way that the recovery management unit writes each page stored in the log volume into the corresponding page in the database, sets the flag in the log volume to completed, and deletes the pages stored in the log volume if the flag in the log volume is set to committed; and deletes the pages stored in the log volume if the flag in the log volume is set to completed.

BRIEF DESCRIPTION OF THE DRAWINGS

The above and other objectives, features and advantages of the present invention will be more clearly understood from the following detailed description in conjunction with the accompanying drawings, in which.

DESCRIPTION OF THE PREFERRED EMBODIMENTS

Detailed characteristics and merits of the invention will become more apparent from the following detailed description taken in conjunction with the accompanying drawings. It should be noted that detailed descriptions of well-known functions and constructions related to the invention will be omitted if they are considered to unnecessarily blur the gist of the present invention.

Figure 1:
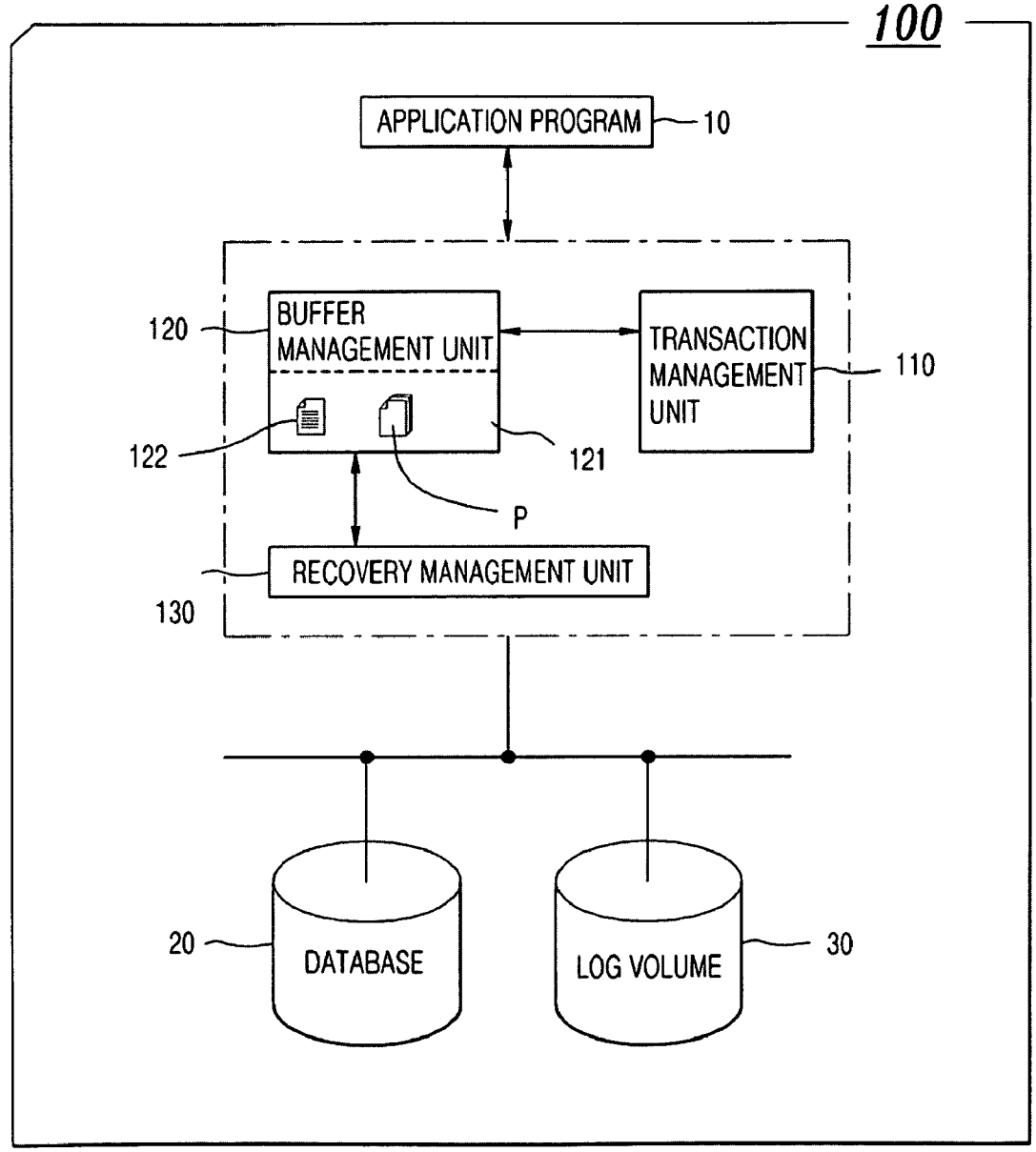
FIG. 1 is the schematic diagram showing the configuration of a storage system using the recovery method according to a preferred embodiment of the present invention.

FIG. 1 is a schematic diagram showing the configuration of a storage system using the recovery method according to a preferred embodiment of the present invention.

As shown in FIG. 1, the transaction management unit 110 of the storage system 100 manages various transactions. Here, the transactions may be deemed to be generated by an application program 10.

The buffer management unit 120 is a configuration for realizing file operations of a transaction. The buffer management unit 120 basically reads a page (data) P from the database 20 to the buffer 121. As will be described later, the buffer management unit 120 according to the present invention temporarily stores the updated buffer pages in the log volume 30, rather than storing the updated buffer pages in the database 20, and stores and manages the log table index 122 in order to manage the log information in the buffer management unit 120. Here, the 'log information', is the information to identify the positions of the pages stored in the log volume.

The above-described log table index is similar to the page table in the shadow page technique, which was described in conjunction with the prior art. However, the page table used in the prior art shadow page technique manages information of all the pages, while the page table index used in the present embodiment manages the information of only the updated pages. This means that, from the viewpoint of system efficiency, the overhead of managing the log table index is considerably lower than that of managing the page table in the shadow page technique.

The log table index 122 can be referenced by the buffer management unit 120 during a transaction. In particular, when the buffer management unit 120 reads a page to the buffer 121 as described above, the page that has been registered in the log table index 122 (i.e., the page that is updated during a transaction) is read from the log volume 30, and the page that has not been registered in the log table index 122 is read from the database 20. Accordingly, the pages in the buffer 121 are always up-to-date.

The flow in which updated buffer pages are temporarily stored in the log volume 30, rather than being stored in the database 20, as described above is similar to that of the prior art deferred update technique. However, in the prior art deferred update technique, not only the database but also the deferred update file must be accessed when a query is executed. Thus, the complexity of the system is high and the system efficiency is low.

Meanwhile, the recovery management unit 130 performs a function of updating the database 20 with pages that are stored in the log volume 30, in compliance with a command from the transaction management unit 110. In particular, when a transaction is committed, the recovery management unit writes (swaps out) updated buffer pages to the log volume, sets the flag in the log volume to committed, writes each page stored in the log volume 30 onto the corresponding page in the database 20, set the flag in the log volume to completed, and deletes all pages stored in the log volume and the log table index.

As described above, because the pages stored in the log volume 30 are written onto the corresponding pages in the database 20 when a transaction is committed, logically related data remain clustered.

The recovery management unit 130 sets the flag in the log volume 30 to committed in order to indicate that a transaction has been 'committed' when a transaction is committed and sets the flag in the log volume to completed in order to indicate that a transaction has been 'completed' when the transaction is completed, as follows:

1. When the transaction is committed: onCommitFlag=committed; and

2. When the transaction is completed: onCommitFlag=completed

The flag illustrated above is used for guaranteeing that recovery is normally performed even when a system failure repeatedly occurs during the process of restarting the system. This is described in greater detail below.

A flow that is related to the recovery in the storage system 100 implementing the recovery method according to the present embodiment is described below with reference to a plurality of flowcharts.

[1. Process of Storing an Updated Buffer Page in the Log Volume (S100)]

Figure 2:
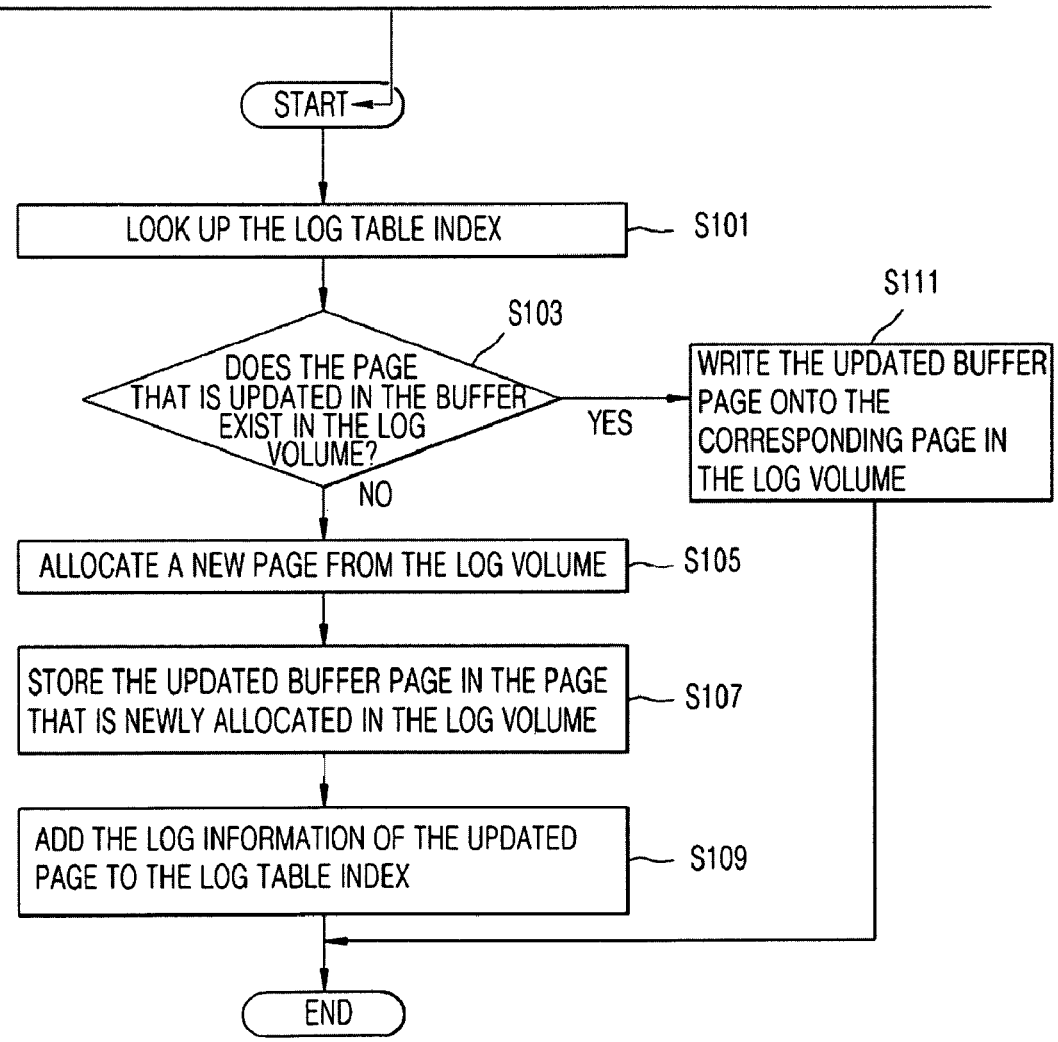
FIG. 2 is the schematic flowchart showing the process of storing an updated buffer page into the log volume according to the preferred embodiment of the present invention.

FIG. 2 shows the process of storing an updated page in the buffer 121 into the log volume 30 when the updated page is selected as a victim during a transaction by the buffer replacement algorithm and should be written on the disk.

As shown in FIG. 2, the buffer management unit 120 determines whether the page that is updated in the buffer exists in the log volume 30 at step S103 by looking up the log table index 122 at step S101.

If, as the result of the determination at step S103, the page that is updated in the buffer does not exist in the log volume 30 (NO), the buffer management unit 120 allocates a new page in the log volume at step S105, stores the updated buffer page in the allocated page at step S107, and adds the log information of the updated page into the log table index 122 at step S109. Here, the 'log information' is used for indexing the positions of the pages stored in the log volume, as described above.

On the other hand, if, as the result of the determination at step S103, the page that is updated in the buffer exists in the log volume 30 (YES), the buffer management unit 120 writes the updated buffer page onto the corresponding page in the log volume 30 at step S111.

[2. Process of Reading a Page from the Database or from the Log Volume (S200)]

Figure 3:
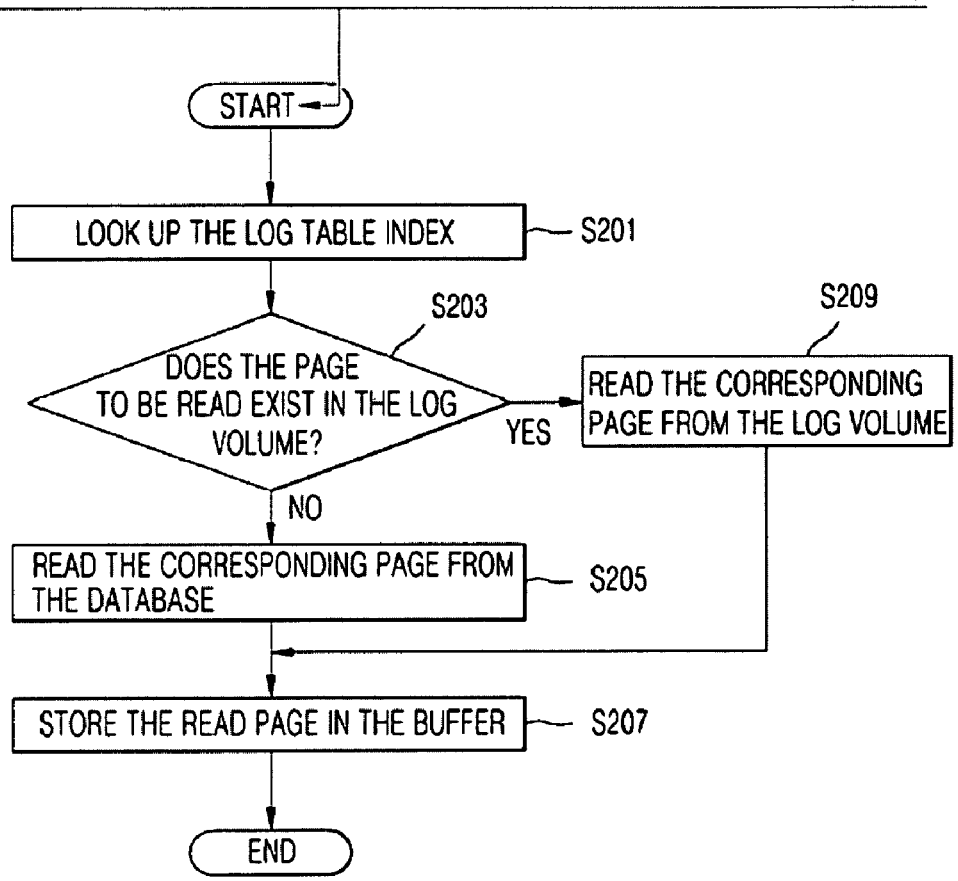
FIG. 3 is the schematic flowchart showing the process of reading a page that does not exist in the buffer from the database or from the log volume according to the preferred embodiment of the present invention.

FIG. 3 shows the process of reading a page that does not exist in the buffer 121 from the database or from the log volume during a transaction.

As shown in FIG. 3, the buffer management unit 120 looks up the log table index 122 at step S201, and then determines whether a page to be read exists in the log volume 30 or not at step S203.

If, as the result of the determination at step S203, the page does not exist in the log volume, the buffer management unit 120 reads the corresponding page from the database 20 at step S205 and stores the read page in the buffer 121 at step S207.

On the other hand, if, as the result of the determination at step S203, the page exists in the log volume, the buffer management unit 120 reads the corresponding page from the log volume 30 at step S209 and stores the read page in the buffer 121 at step S207.

[3. Process of Committing a Transaction (S300)]

Figure 4:
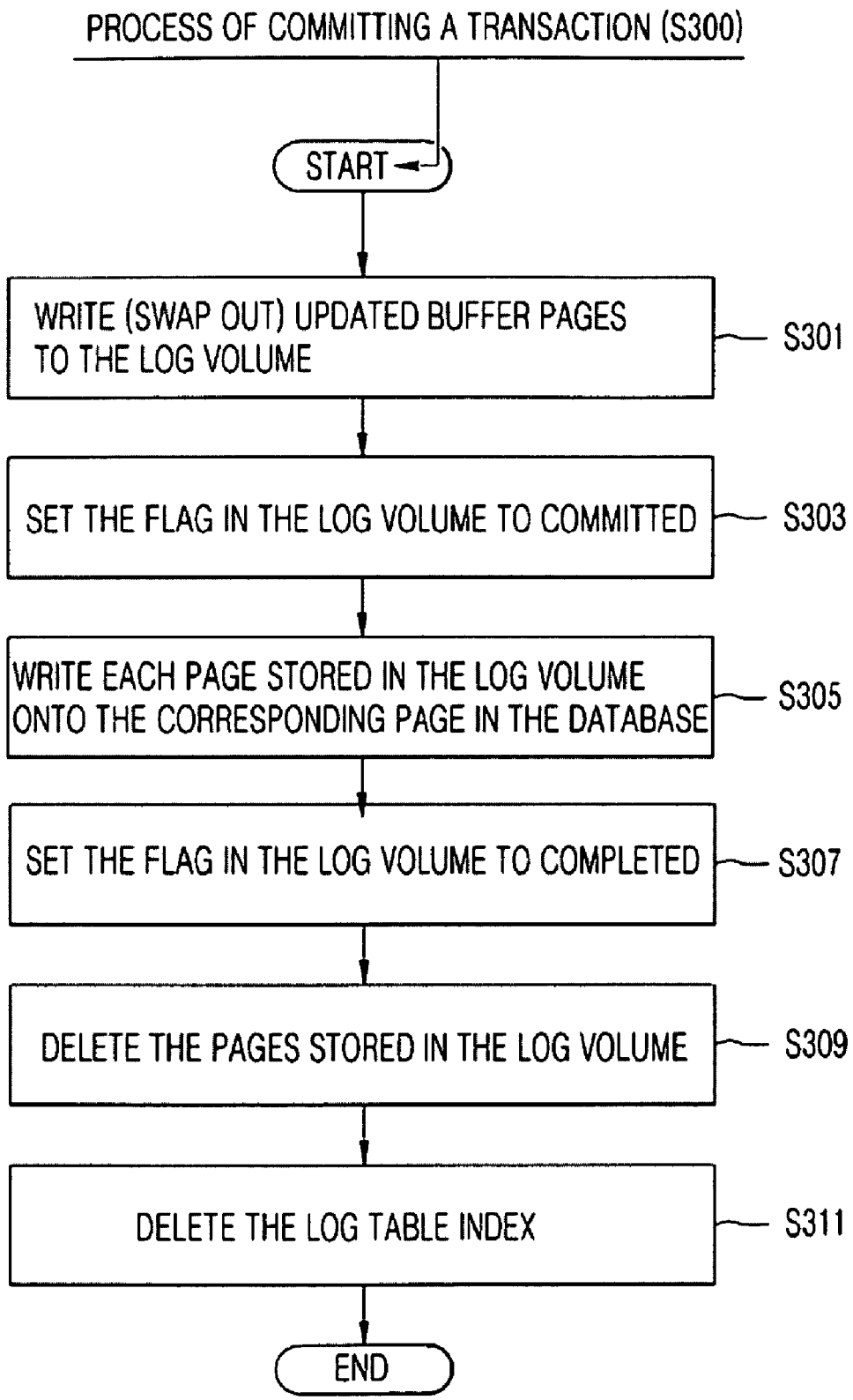
FIG. 4 is the schematic flowchart showing the process of committing a transaction according to the preferred embodiment of the present invention.

FIG. 4 is a schematic flowchart showing the process of committing a transaction. It is preferred that this process be performed after the process S100 and/or the process S200.

The recovery management unit 130 writes (swaps out) updated buffer pages to the log volume at step S301, sets the flag (onConmitFlag), which indicates that the transaction has been committed, in the log volume 30 to committed in compliance with a transaction commit command from the transaction management unit 110 at step S303.

Thereafter, the recovery management unit 130 writes each page stored in the log volume onto the corresponding page in the database 20 at step S305.

After the step S305 is performed, the recovery management unit 130 sets the flag to completed, which has been set to committed at step S303, at step S307, deletes all pages stored in the log volume at step S309, and deletes the log table index at step S311.

[4. Process of Aborting a Transaction (S400)]

Figure 5:
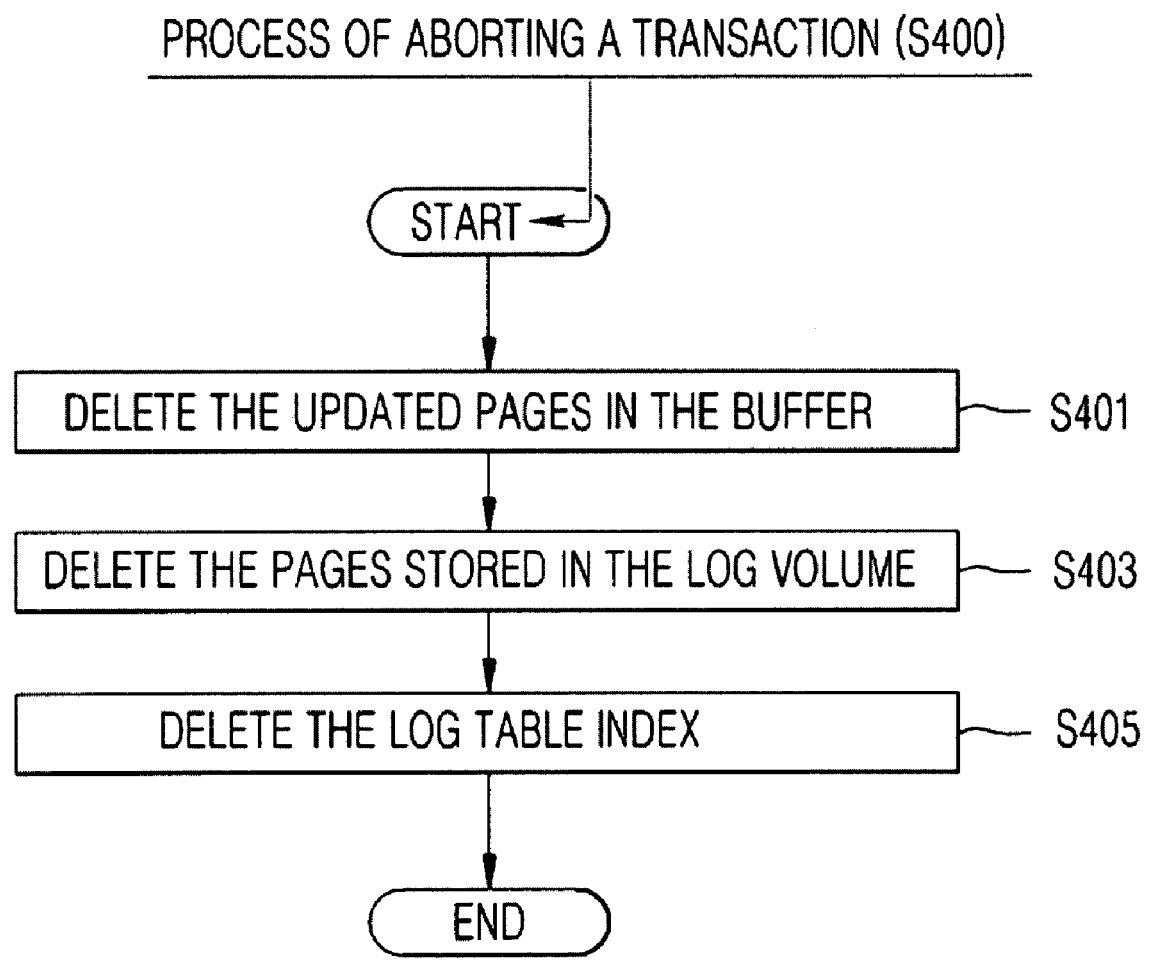
FIG. 5 is the schematic flowchart showing the process of aborting a transaction according to the preferred embodiment of the present invention.

FIG. 5 is a schematic flowchart showing the process of aborting a transaction.

Because updated pages in the buffer 121 have not been reflected in the database 20, the recovery management unit 130 deletes the updated pages in the buffer 121 at step S401 and also deletes the pages stored in the log volume 30 at step S403.

Thereafter, the recovery management unit 130 deletes corresponding entries in the log table index 121 in the buffer management unit 120 at step S405.

This process is characterized in that it does not need an undo process that is typically performed along with the process of aborting a transaction.

[5. Process of Restarting a System (S500)]

Figure 6:
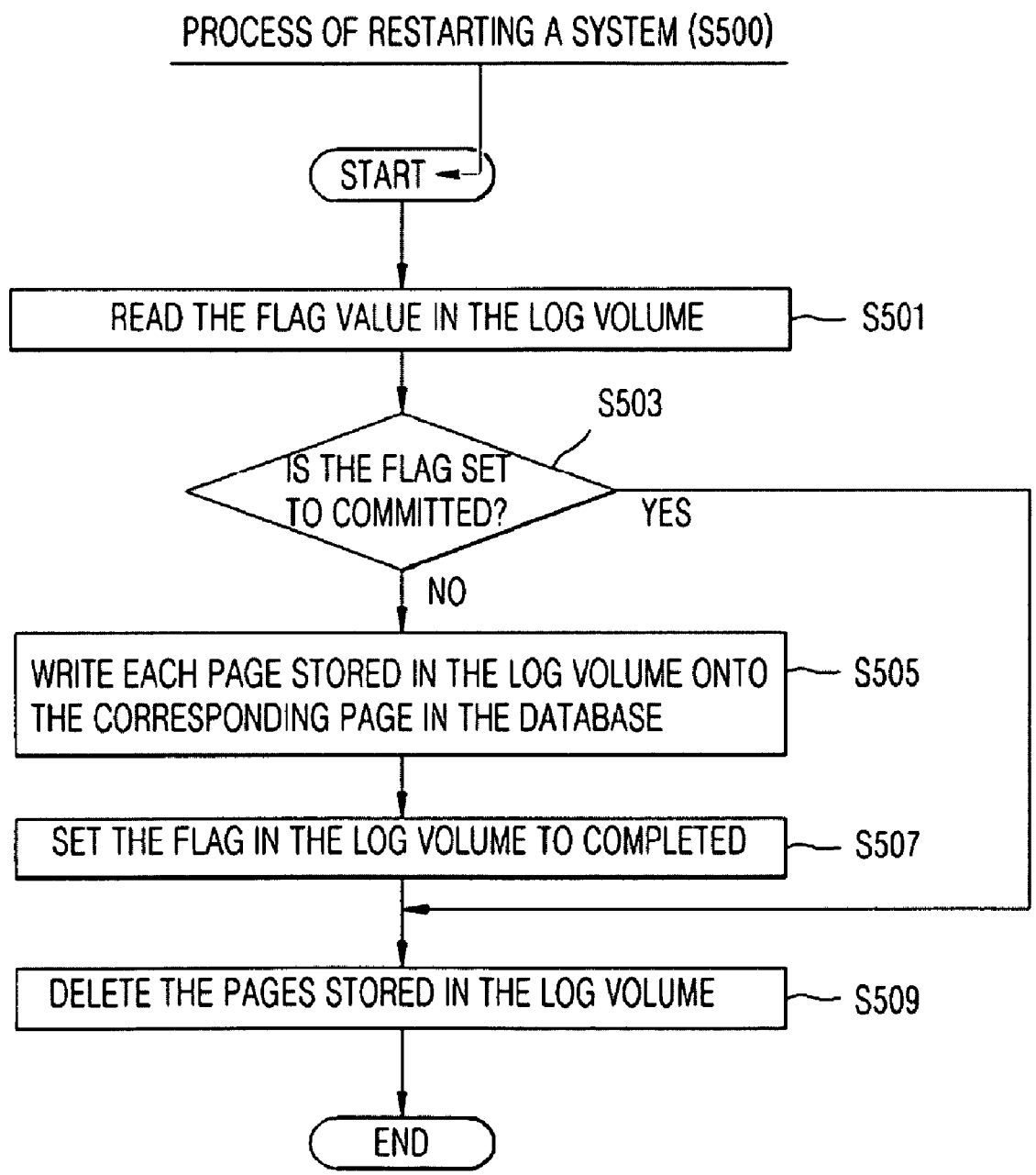
FIG. 6 is the schematic flowchart showing the process of restarting a system according to the preferred embodiment of the present invention.

FIG. 6 is a schematic flowchart showing the process of restarting a system. This process is the recovery process when a system crashed upon failure.

The recovery management unit 130 reads the flag value in the log volume at step S501, and determines whether the flag onCommitFlag in the log volume 30 is set to committed at step S503.

If, as the result of the determination at step S503, the flag onCommitFlag in the log volume 30 is set to committed, the recovery management unit 130 writes each page stored in the log volume 30 onto the corresponding page in the database at step S505. Because the fact that the flag is set to committed means that a system failure has occurred while writing the pages in the log volume onto the pages in the database 20, the database 20 should again be updated with the pages in the log volume 30.

After the step S505 is performed, the recovery management unit 130 sets the flag to completed at step S507 and deletes the pages stored in the log volume 30 at step S509, thereby completing the recovery process based on the process of restarting the system.

On the other hand, if, as the result of the determination at step S503, the flag onCommitFlag in the log volume 30 is not set to committed, that is, the flag onCommitFlag is set to completed, the recovery management unit 130 performs the step S509 and terminates the recovery process. For reference, this step corresponds to the case in which a system failure occurs after the flag is set to completed.

In the process of restarting the system, deleting the log table index is needless because the log table index in the memory was automatically deleted when the process was terminated by the system failure.

According to the present invention, a deferred update file does not need to be accessed additionally for query processing, unlike the prior art deferred update technique, and the system efficiency increases. Furthermore, according to the present invention, even when the data in the database is updated, the positions of the updated pages do not change, unlike those in the prior art shadow page technique. Accordingly, disk access performance is not degraded because the clustering of data that are logically related to each other is preserved.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A computer storage system having a processor configured to recover data comprising:

a transaction management unit for managing a computer transactions;

a buffer management unit being configured to read a data page from a database or a log volume into a buffer and configured to store an updated data page into the log volume, wherein said updated data page is said data page having any changes made thereto in the transaction, the buffer management unit further configured to read from and write to a log table index of indexing location information of a plurality of updated data pages stored in the log volume, wherein during the transaction, the buffer management unit is further configured to read to updated data page from the log volume to the buffer when the log table index indicates said data page has changes made thereto and configured to read to the buffer the data page from the database when the log table index indicates said data page has no changes; and a recovery management unit in response to a command from the transaction management unit is configured to commit the transition, and wherein the configuration of the recovery management unit to commit to the transaction is further configured to: (a) store the updated data pages in the buffer to the log volume, (b) set a flag in the log volume to committed, (c) write the updated data pages in the log volume to the database, (d) re-set the flag in the log volume to completed, (e) delete the updated data pages from the log volume and (f) delete the indexing location information corresponding to the updated data page from the log table index.

2. The storage system as set forth in claim 1, wherein:

the buffer management unit searches the log table index and writes the updated data page in the buffer onto the corresponding data page in the log volume if the data page exists in the log volume; and the buffer management unit searches the log table index and stores the updated data page in the buffer onto the corresponding data page that is created in the log volume, and adds indexing location information to the log table index of the updated data page if the page does not exist in the log volume.

3. A computer storage system having a processor configured to recover data comprising:

a transaction management unit for managing a computer transactions; a buffer management unit being configured to read a data page from a database or a log volume into a buffer and configured to store an updated data page into the log volume, wherein said updated data page is said data page having any changes made thereto in the transaction, the buffer management unit further configured to read from and write to a log table index of indexing location information of a plurality of updated data pages stored in the log volume, wherein during the transaction, the buffer management unit is further configured to read to updated data page from the log volume to the buffer when the log table index indicates said data page has changes made thereto and configured to read to the buffer the data page from the database when the log table index indicates said data page has no changes; and a recovery management unit in response to a command from the transaction management unit is configured to abort the transaction, and wherein the configuration of the recovery management unit to abort the transaction is further configured to: (a) delete the updated data pages from the buffer, (b) delete the updated data pages from the log volume, and (c) delete the indexing location information corresponding to the updated data page from the log table index.

4. A computer storage system having a processor configured to recover data comprising:

a transaction management unit for managing a computer transactions; a buffer management unit being configured to read a data page from a database or a log volume into a buffer and configured to store an updated data page into the log volume, wherein said updated data page is said data page having any changes made thereto in the transaction, the buffer management unit further configured to read from and write to a log table index of indexing location information of a plurality of updated data pages stored in the log volume, wherein during the transaction, the buffer management unit is further configured to read to updated data page from the log volume to the buffer when the log table index indicates said data page has changes made thereto and configured to read to the buffer the data page from the database when the log table index indicates said data page has no changes; and a recovery management unit in response to a command from the transaction management unit is configured to restart the system, and wherein the configuration of the recovery management unit to restart the system is further configured to: (a) write each updated data page stored in the log volume to a corresponding data page in the database, (b) set a flag to completed, and (c) delete each updated data page stored in the log volume if the flag in the log volume is set to committed; and configured to delete each updated data page stored in the log volume if the flag in the log volume is set to completed.

* * * * *